(12) United States Patent
Ueda et al.

(10) Patent No.: US 7,685,521 B1
(45) Date of Patent: Mar. 23, 2010

(54) INFORMATION SEARCHING APPARATUS, METHOD AND MEMORY MEDIUM THEREFOR

(75) Inventors: Takaya Ueda, Yokohama (JP); Yuji Ikeda, Kawasaki (JP); Kenichi Fujii, Yokohama (JP); Fumiaki Itoh, Yokohama (JP); Noriko Otani, Ageo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,590

(22) Filed: Mar. 17, 2000

(30) Foreign Application Priority Data

Mar. 23, 1999 (JP) .................................. 11-077584

(51) Int. Cl.
*G06F 3/00* (2006.01)
(52) U.S. Cl. ...................................... 715/722; 715/968
(58) Field of Classification Search ................. 345/804, 345/805, 806–807, 802, 814–816, 853–855, 345/766–767, 711–714, 782, 716–717, 723–726; 707/104.1, 102, 10; 715/968, 714–726, 748–749
See application file for complete search history.

(56) References Cited

U.S. PATENT DOCUMENTS

| | | | | |
|---|---|---|---|---|
| 5,546,145 | A * | 8/1996 | Bernardi et al. ............. | 396/312 |
| 5,553,277 | A * | 9/1996 | Hirano et al. ............ | 707/104.1 |
| 5,632,022 | A * | 5/1997 | Warren et al. ................ | 345/853 |
| 5,652,851 | A * | 7/1997 | Stone et al. .................. | 345/804 |
| 5,778,373 | A   | 7/1998 | Levy et al. ................... | 707/100 |
| 5,864,363 | A * | 1/1999 | Giefing et al. .............. | 348/143 |
| 5,873,080 | A * | 2/1999 | Coden et al. .................... | 707/3 |
| 6,101,338 | A * | 8/2000 | Bernardi et al. ............. | 396/287 |
| 6,256,419 | B1 * | 7/2001 | Nagasaka et al. ........... | 382/236 |
| 6,282,547 | B1 * | 8/2001 | Hirsch ........................ | 707/102 |
| 6,380,954 | B1 * | 4/2002 | Gunther et al. ............. | 345/764 |
| 6,385,334 | B1 * | 5/2002 | Saneyoshi et al. ........... | 382/154 |
| 6,405,216 | B1 * | 6/2002 | Minnaert et al. ........... | 707/104.1 |
| 6,483,878 | B1 * | 11/2002 | Yonezawa et al. ...... | 375/240.25 |
| 6,507,366 | B1 * | 1/2003 | Lee ............................. | 348/352 |
| 6,512,857 | B1 * | 1/2003 | Hsu et al. .................... | 382/294 |
| 6,526,400 | B1 * | 2/2003 | Takata et al. ................... | 707/3 |
| 6,571,015 | B1 * | 5/2003 | Matsuo et al. .............. | 382/232 |
| 6,573,907 | B1 * | 6/2003 | Madrane ..................... | 715/719 |
| 6,643,643 | B1 * | 11/2003 | Lee et al. ....................... | 707/5 |
| 6,704,466 | B1 * | 3/2004 | Yamamoto et al. .......... | 382/305 |
| 6,768,563 | B1 * | 7/2004 | Murata et al. ............... | 358/450 |
| 6,795,818 | B1 * | 9/2004 | Lee ................................ | 707/3 |
| 6,829,619 | B1 * | 12/2004 | Wakamatsu et al. ...... | 707/104.1 |
| 6,842,190 | B1 * | 1/2005 | Lord et al. ............... | 348/231.5 |
| 7,010,036 | B1 * | 3/2006 | Mory .................... | 375/240.08 |

FOREIGN PATENT DOCUMENTS

| | | |
|---|---|---|
| JP | 6-284330 | 10/1994 |
| JP | 10-091634 | 4/1998 |
| JP | 11-027609 | 1/1999 |

* cited by examiner

*Primary Examiner*—Steven P Sax
(74) *Attorney, Agent, or Firm*—Fitzpatrick, Cella, Harper & Scinto (57) ABSTRACT

Range of the object of search is specified without specific designation by the user. In case changing of the image is instructed by an image operation portion, an image changing portion changes the image and displays such image on an image display portion, and the displayed image is held in a scope holding portion as the range of the object of search. The operation from a map operation portion also is similarly processed, whereby the range of the document constituting the object of search can be specified without specific designation by the user.

2 Claims, 9 Drawing Sheets

INFORMATION SEARCHING APPARATUS, METHOD AND MEMORY MEDIUM THEREFOR

BACKGROUND OF THE INVENTION

1. Field of the Invention

The present invention relates to an information searching apparatus, and more particularly to an information searching apparatus for searching information relating to an object designated with a camera or a map, and a control method therefor.

2. Related Background Art

With increase in the capacity of memory devices and with popularization of networks, there is being widely employed a document searching system for searching a desired document among the documents of a large amount present on a local disk or a network.

On the other hand, there is already developed a system having plural computer-controlled cameras and capable of viewing the images of such cameras through a network, and there is also developed a system of linking document information thereto and displaying information relating to the object viewed by the camera.

There is further developed a system of linking a map and document information and displaying information relating to the object designated on the map, and there is even known a system in which the above-mentioned system and a document searching system are combined.

In such system, however, the document search is executed on all the registered documents. Therefore, even in case the user is looking at an object, the result obtained in a search inevitably contains information not related to such object. Though it is possible to limit the object of search, the user is required to clearly designate the object in such case.

SUMMARY OF THE INVENTION

The present invention provides, in an embodiment thereof, an information searching apparatus comprising display means including plural areas such as an image display area, a map display area, a document display area etc., execution means for selecting an arbitrary display area from the above-mentioned plural display areas and executing an editing operation on thus selected display area, and changing means for changing the content of display of another display area according to the editing operation by the execution means.

DESCRIPTION OF THE PREFERRED EMBODIMENTS

In the following the present invention will be clarified in detail by embodiments thereof, with reference to the attached drawings.

In the present embodiment, there is conceived a system capable of displaying a map, the image of a computer-controllable camera and document information, which are changed in mutual linkage, according to the mutual correlation.

In the present system, the object to which the user pays attention (such object being hereinafter called scope) can be changed by an operation on a map, an operation on a camera or an operation on a document.

Figure 1:
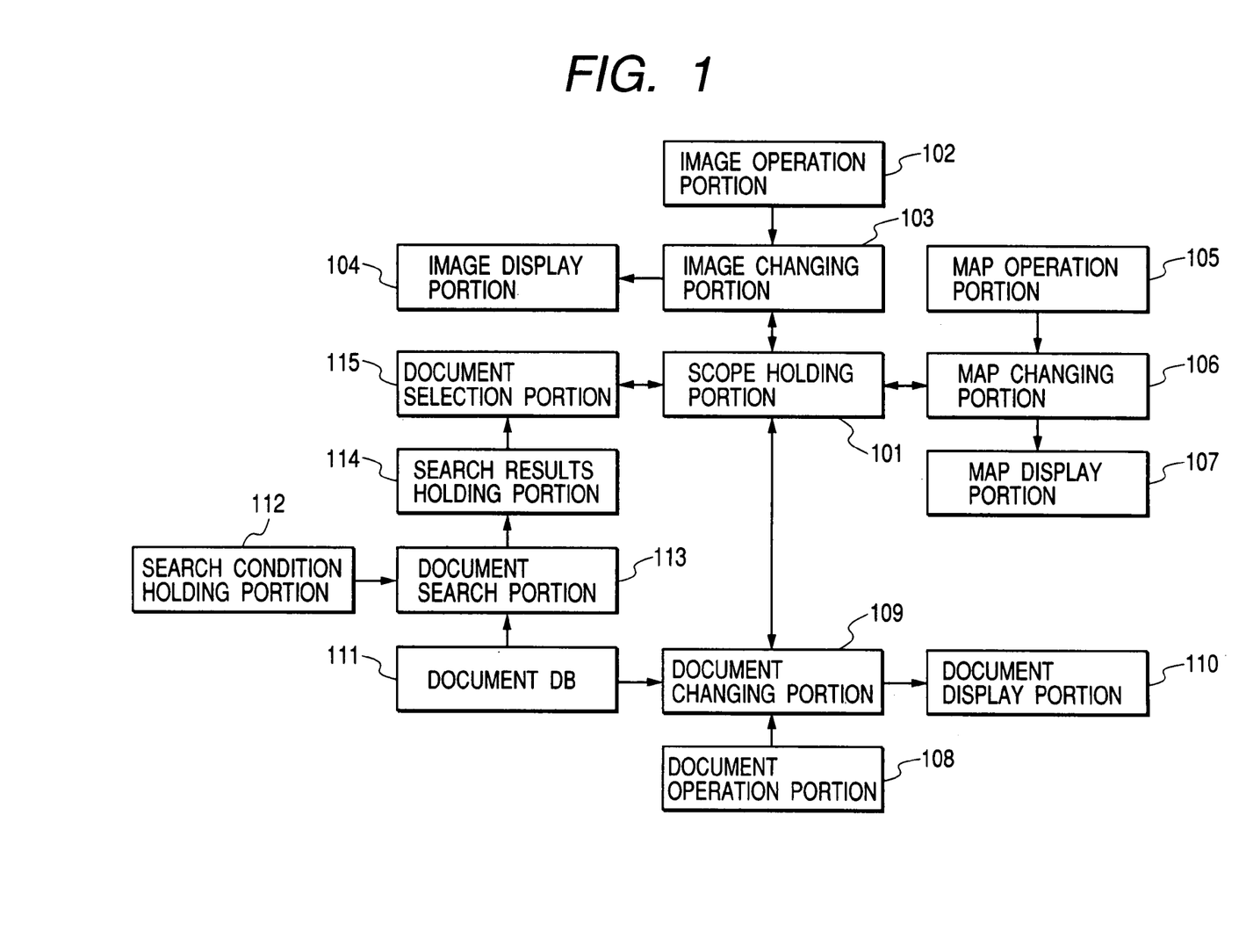
FIG. 1 is a block diagram showing the basic configuration of an information searching apparatus in an embodiment of the present invention.

FIG. 1 is a block diagram showing the basic configuration of an information searching apparatus constituting an embodiment of the present invention.

A scope holding portion 101 holds a current scope (information indicating the range of the object of search). When there is received a notice indicating a change in the scope from an image changing portion 103, a map changing portion 106 or a document changing portion 109, a notice indicating the change in the scope is transmitted to the above-mentioned portions other than the notice-issuing portion.

An image operation portion 102 changes the camera direction (panning, tilting etc.) and the zoom ratio of the camera thereby changing the image taking range. The object within the image taking range constitutes a new scope. An image changing portion 103 instructs an image change in case the image taking range is changed by the image operation portion 102 or in case a notice for scope change is received from the scope holding portion 101.

In case the image taking range is changed by the image operation portion 102, such scope change is transmitted to the scope holding portion 101. An image display portion 104 displays an image instructed by the image changing portion 103. A map operation portion 105 selects a point or an area in a map and changes the scope indicated on the map. Thus selected scope constitutes a new scope.

A map changing portion 106 instructs changing of map in case certain scopes are selected by the map operation portion 105 or in case a notice for scope change is received from the scope holding portion 101. In case the scope is changed by the map operation portion 105, such scope change is transmitted to the scope holding portion 101. A map display portion 107 displays a map as instructed by the map changing portion 106.

A document operation portion 108 changes the displayed document in response to a click of a button or a link contained in the document. The scope changes according to the designation of the displayed document. A document changing portion 109 instructs changing of the displayed document in case the displayed document is changed by the document operation portion 108 or in case a notice for scope change is received from the scope holding portion 101. In case the scope is changed by the document operation portion 108, the scope change is transmitted to the scope holding portion 101. A document display portion 110 displays a document instructed by the document changing portion 109. A document database 111 constitutes the object to be displayed in the document display portion 110 and the object of search. In each document in the document database 111, there is described in advance a scope to which the document corresponds.

A search condition holding portion 112 holds a search condition for searching the document in the document database 111. A document search portion 113 searches, in the document database 111, a document matching the search condition hold in the search condition holding portion 112. A search result holding portion 114 holds the result searched by the document search portion 113. A document selection portion 115 selects a document matching the current scope, in the search result held in the search result holding portion 114.

Figure 2:
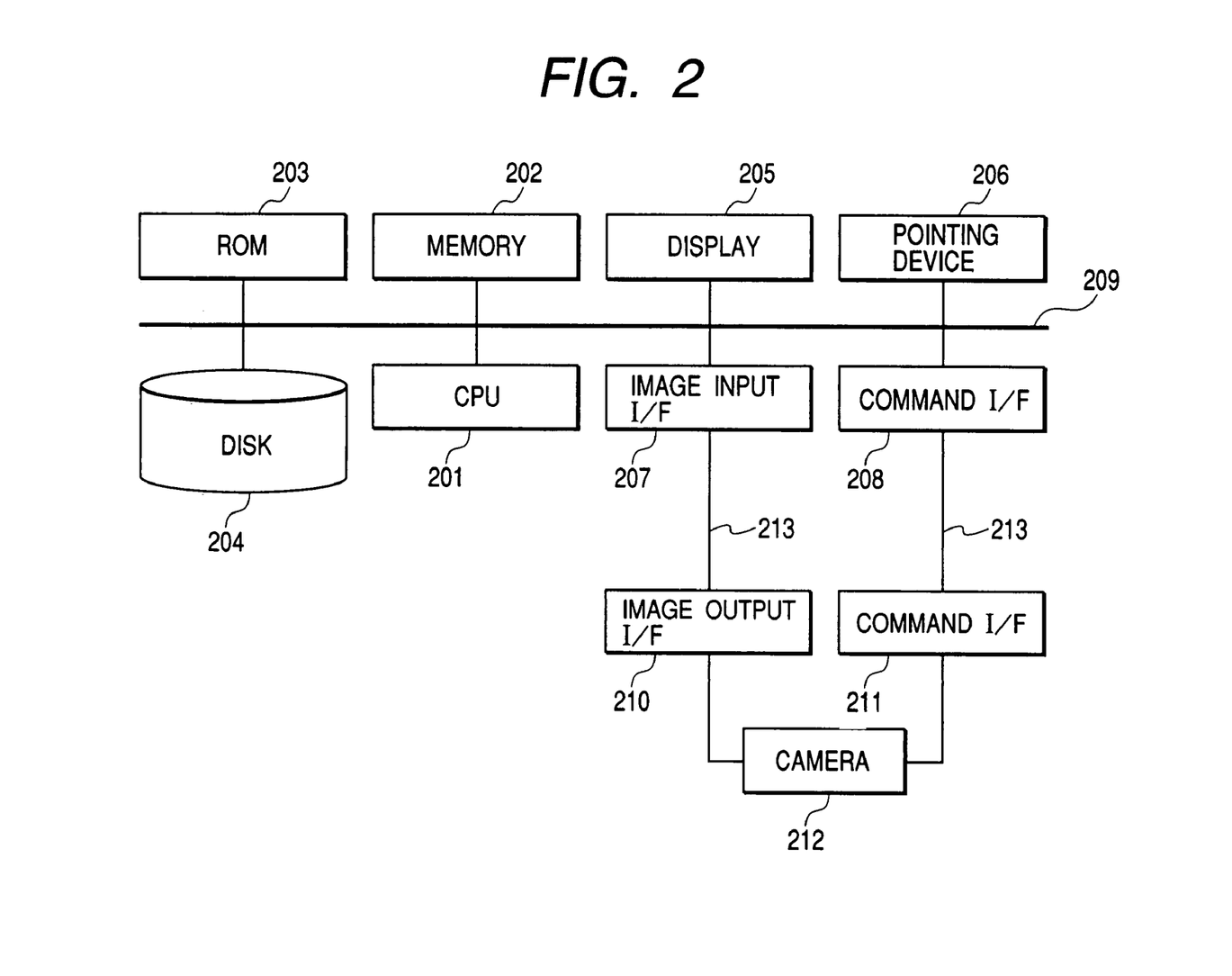
FIG. 2 is a block diagram showing the specific configuration of an embodiment of the present invention.

FIG. 2 is a view showing the specific configuration of the information searching apparatus of the present embodiment.

In FIG. 2, there are shown a CPU (central processing unit) 201 functioning according to a program for realizing the procedure to be explained later, a memory 202 providing memory areas required for the scope holding portion 101, search condition holding portion 112 and search result holding portion 114 and for the execution of the above-mentioned program, a ROM 203 for holding a program required for realizing the sequence to be explained later, a disk device 204 constituting the document database 111, and a display 205 constituting the image display portion 104, map display portion 107 and document display portion 110.

There are also shown a pointing device 206 realizing the image operation portion 102, map operation portion 105 and document operation portion 108, an image input interface 207 for fetching the image from a camera, a command interface 208 for executing command exchange with the camera, a bus 209, an image output interface 210 for image output from the camera, a command interface 211 for executing command exchange with the client side, a camera 212, and a network cable or a serial cable 213.

In the following there will be explained the process sequence in the information searching apparatus of the present embodiment.

In the present embodiment, there will be explained a case of applying the present system to a group of stores or a shopping mall.

In such store group or shopping mall, there is installed at least a camera, which can be controlled from the image changing portion 103. In such case, the entire scope is the entire group of stores, and the scope corresponds to each store. As explained in the foregoing, each document in the document database 111 contains in advance a scope corresponding to such document, namely to which store the document relates. Also the scope holding portion 101 holds information "entire" in case of an entire scope, or the name of the shop in case of non-entire scope.

Figure 3:
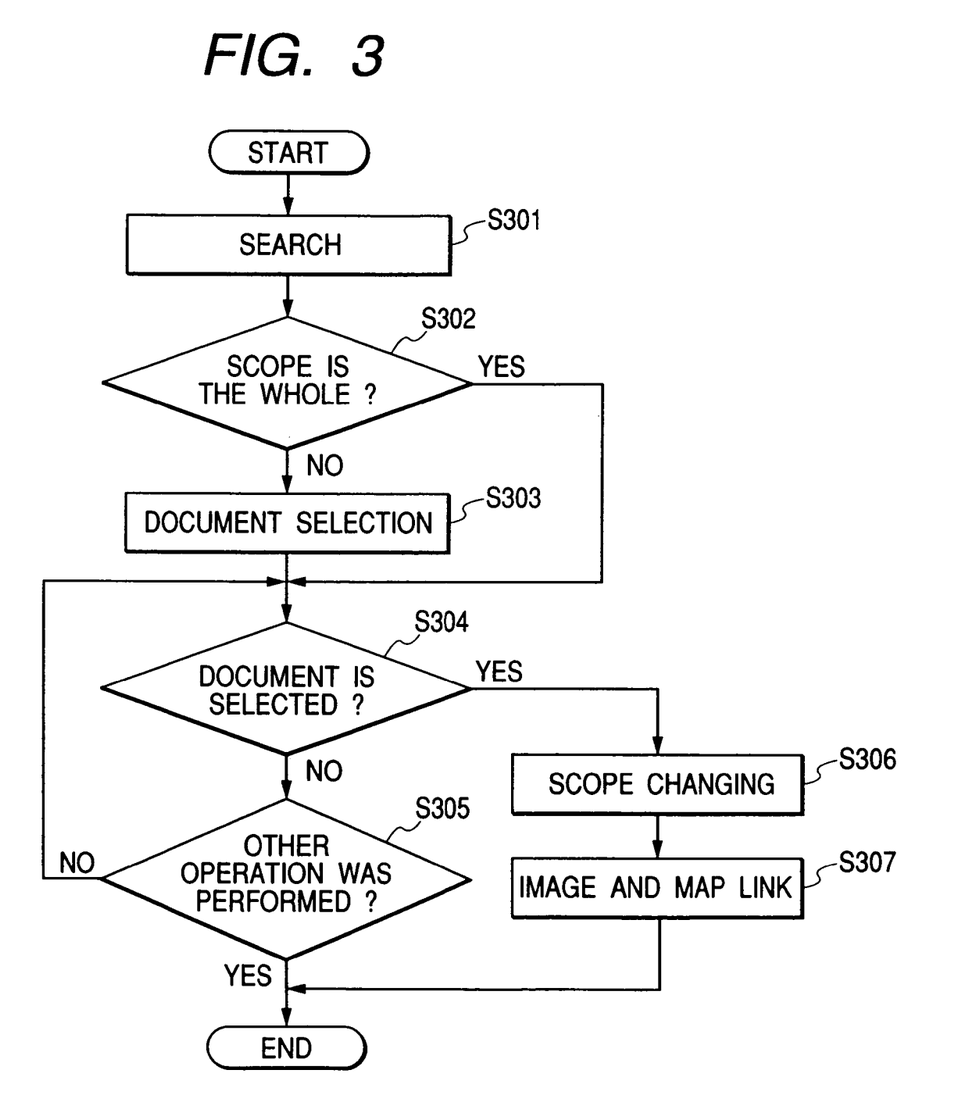
FIG. 3 is a flow chart showing the outline of a search process in an embodiment of the present invention.

Now reference is made to a flow chart in FIG. 3 for explaining the process sequence of the present embodiment.

In a step S301, the document searching portion 113 searches, in the document database 111, a document meeting the search condition held in the search condition holding portion 112, and holds the result of search in the search result holding portion 114. The search process may be executed in any known search method such as keyword search or whole-sentence search.

A step S302 refers to the scope holding portion 101 to identify whether the current scope indicates the entire shopping mall or a specified store, and the sequence proceeds to a step S304 or S303 respectively if the current scope indicates the entire mall or a specified store.

A step S303 selects, among the search result held in the search result holding portion 114, the result matching the current scope. For example, if the scope indicates a store A, there are selected documents relating to the store A. Since each document contains in advance information indicating the store to which the document relates, the documents relating to the store A can be selected by referring to such information. The obtained result is held again in the search result holding portion 114.

A list of the result held in the search result holding portion 114 is displayed in the document display portion 110. The user can select any document in such list. A step S304 discriminates whether the user has selected a document in the search result, and the sequence proceeds to a step S306 or S305 respectively if selected or not.

A step S305 discriminates whether any other operation has been executed by the user, and, if executed, the current searching process is regarded completed and the sequence is terminated.

A step S306 changes the content of the scope holding portion 101 to the store corresponding to the document selected by the user. Then a step S307 operates the image and map corresponding to the new scope, namely informs the image changing portion 103 and the map changing portion 106 of the change in the scope, and the process is terminated.

Figure 4:
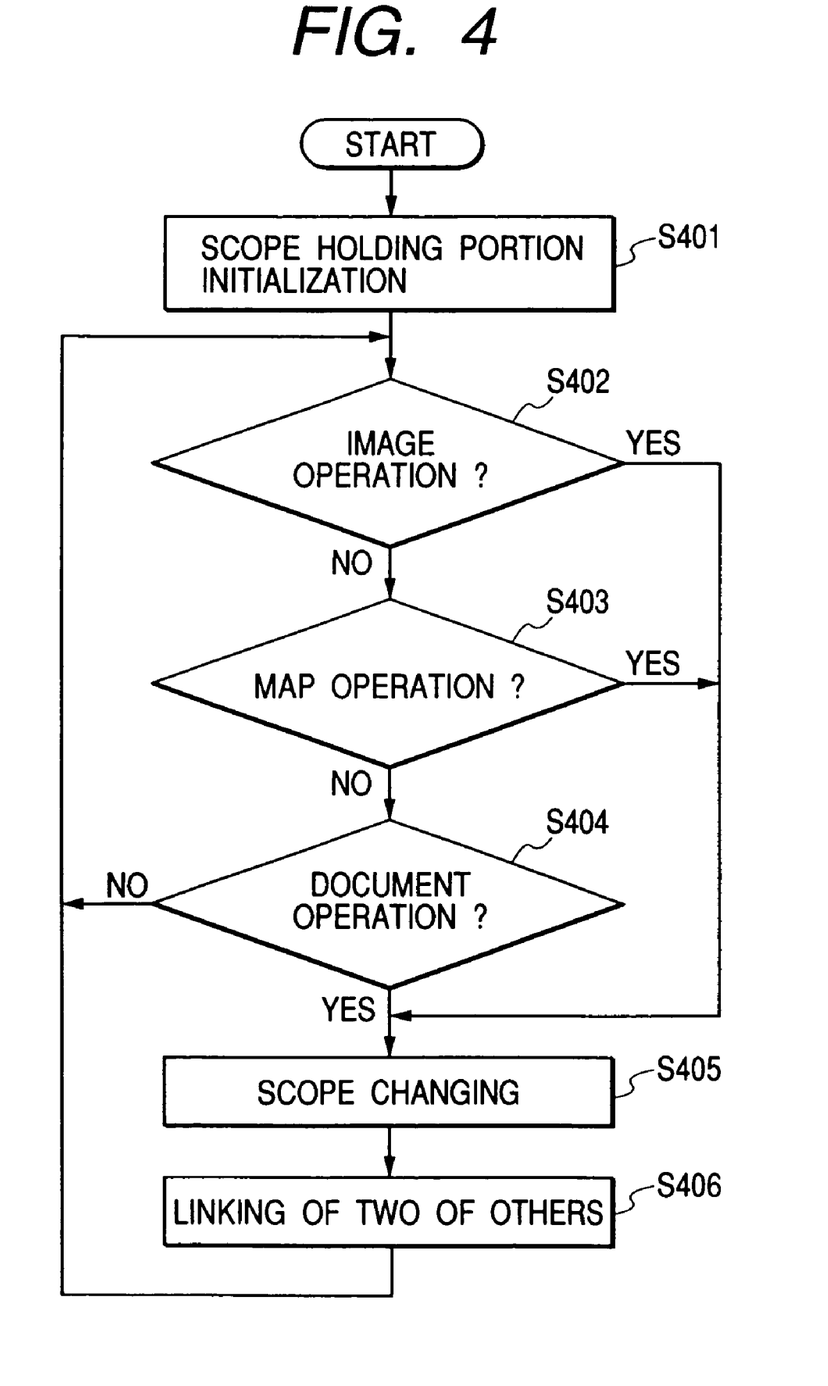
FIG. 4 is a flow chart showing the output line of a scope changing process in an embodiment of the present invention.

Now reference is made to a flow chart in FIG. 4 for explaining the rewriting process for the content of the scope holding portion.

It is assumed that the correspondence between the map, camera image or document and the scope (store) is given in advance. Such correspondence may be given by a manual operation or may be automatically extracted.

At first a step S401 initializes the scope holding portion. In the initialized state, the scope is assumed to be "entire".

A step S402 discriminates whether an image operation has been executed, and the sequence proceeds to a step S405 or S403 respectively if an image operation has been executed or not. A step S403 discriminates whether a map operation has been executed, and the sequence proceeds to a step S405 or S404 respectively if a map operation has been executed or not. A step S404 discriminates whether a document operation has been executed, and the sequence proceeds to a step S405 if executed, but returns to the step S402 for repeating the above-described process if the document operation has not been executed.

A step S405 executes a scope changing process. As the scope is changed according to the process, the new scope is held in the scope holding portion 101. A step S406 operates the two of image/map/document that have not been operated, corresponding to the content of the scope holding portion 101. More specifically, the change in the scope is informed to the two among the image changing portion 103, the map changing portion 106 and the document changing portion 109. Then the sequence returns to the step S402 to repeat the above-described process.

In the following there will be explained the function of the present embodiment, with reference to FIGS. 8 to 10.

Figure 8:
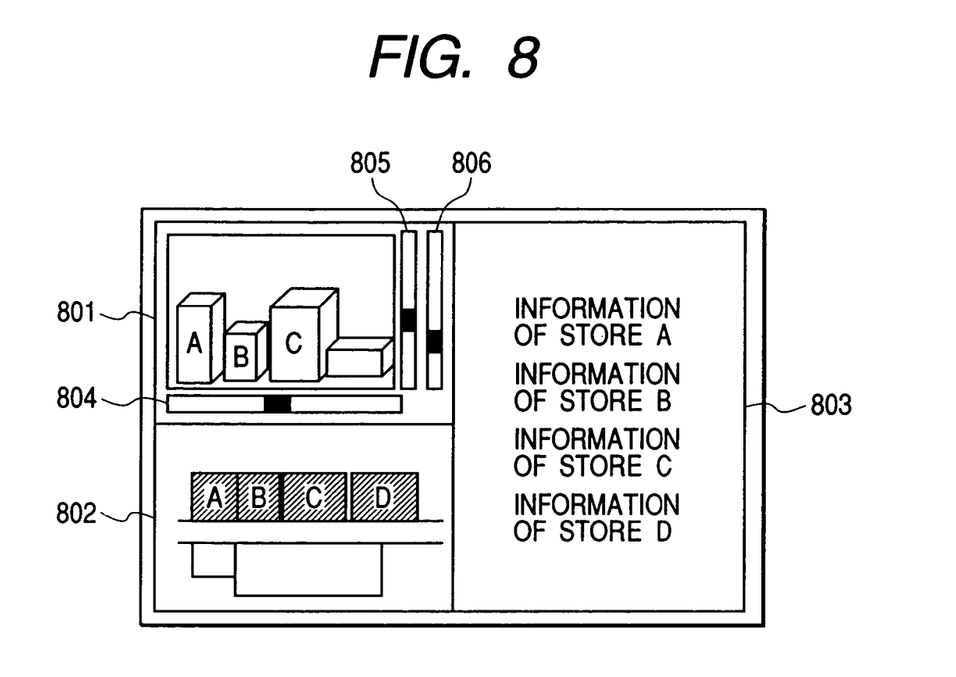
FIGS. 8, 9 and 10 are views showing specific examples of an embodiment of the present invention.
Figure 9:
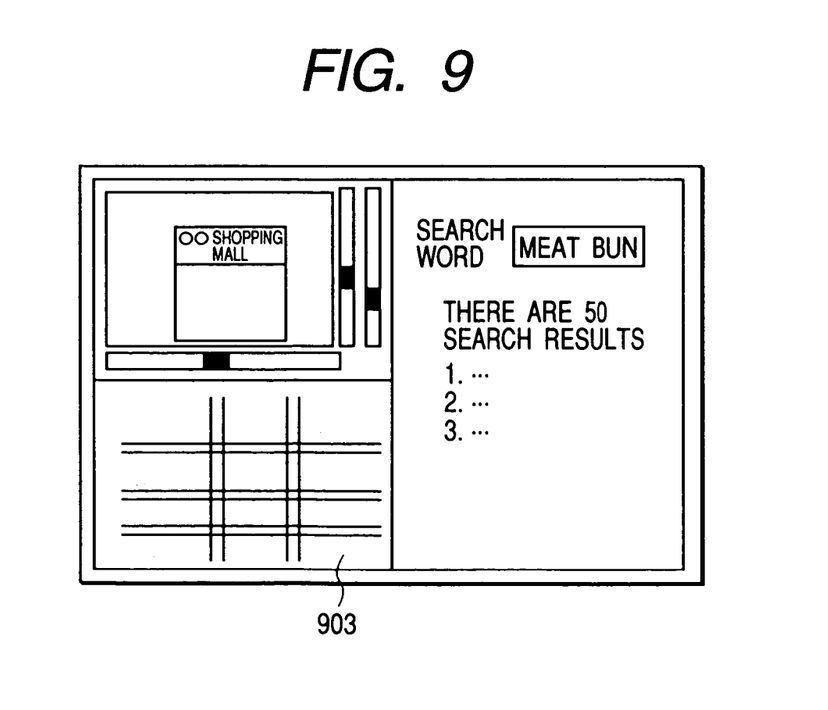

FIG. 8 shows an example of the image displayed in the present embodiment.

In FIG. 8 there are shown an image display portion 801, a map display portion 802, a document display portion 803, an image panning operation portion 804, an image tilting operation portion 805, and an image zooming operation portion 806.

The image displayed in the image display portion 801 can be manipulated by these operation portions. Also with respect to the map displayed in the map display portion 802, the display area can be manipulated by an area designation with a pointing device.

As explained in the foregoing description of the present embodiment, the information displayed on the image display portion 801, map display portion 802 and document display portion 803 are mutually linked, so that, in case the image display portion 801 displays the image of stores A, B, C and D, also the map display portion 802 displays these stores A, B, C and D and the document display portion 803 displays the information of the same stores.

It is now assumed that the document database 111 contains 50 documents matching a search condition "meat bun" and including 1 document relating to a store A.

In the initial state (wherein the scope is the entire shopping mall), the search with the search condition "meat bun" provides a result of 50 documents. FIG. 9 shows the search in such initial state. In FIG. 9, the image display portions displays the entrance of the shopping mall (indicating that the entire shopping mall is the scope), and the map display portion displays the map of the entire shopping mall.

Figure 10:
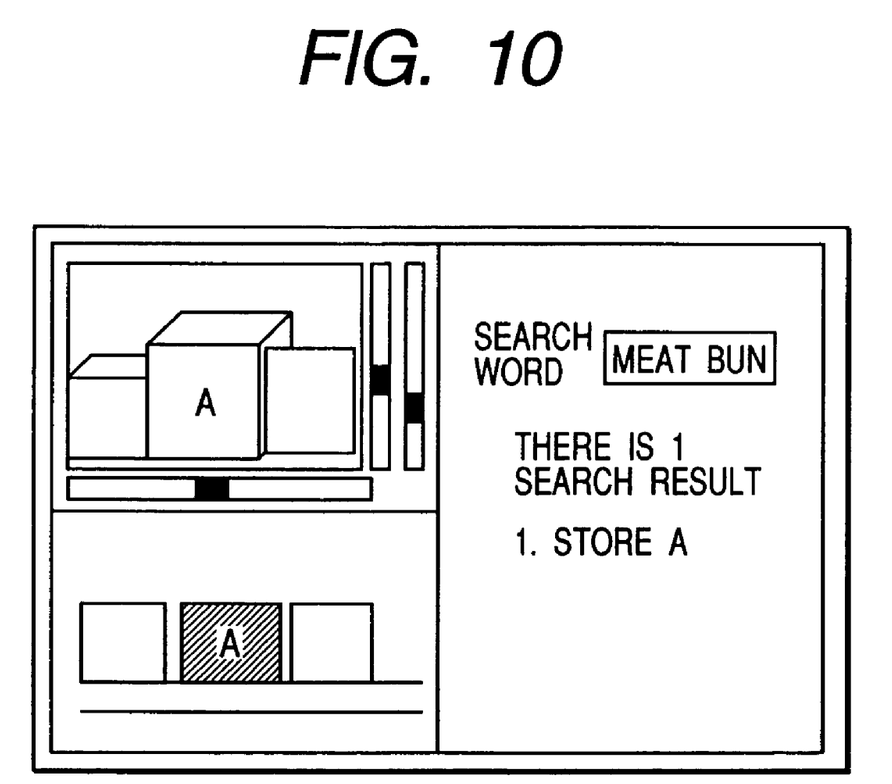

Then the user manipulates the image in such a manner that the store A alone is displayed in the image display portion (FIG. 10). At this point the scope holding portion 101 holds the store A alone, and the store A is also displayed in the map display portion in linkage with the image. If the search is executed under the search condition "meat bun", the document searching portion 113 provides 50 documents as in the foregoing case but the document selecting portion 115 selects those matching the current scope, so that the final result of search contains only one document relating to the store A. Thus the object desired by the user can be searched in a natural manner.

The above-described process allows to execute search on the store contemplated by the user, without definite designation of the scope by the user, so that the efficiency of search can be improved.

Other Embodiments

In the foregoing embodiment there has been explained a case of selecting only one store as the search result, but such case is not restrictive and there may be selected plural stores. In such case a list of the stores is held in the scope holding portion and, in selecting the documents, there are selected documents corresponding to any of such stores. Such plural stores are displayed in the image and in the map.

As the selected plural stores may not be mutually adjacent, there is provided means for setting the image scope and the map scope. Such means sets a map scope and an image scope for example by a method of selecting an arbitrary one among the stores or a method of selecting a scope capable of displaying all the selected plural stores, and displays the map and the image.

Figure 5:
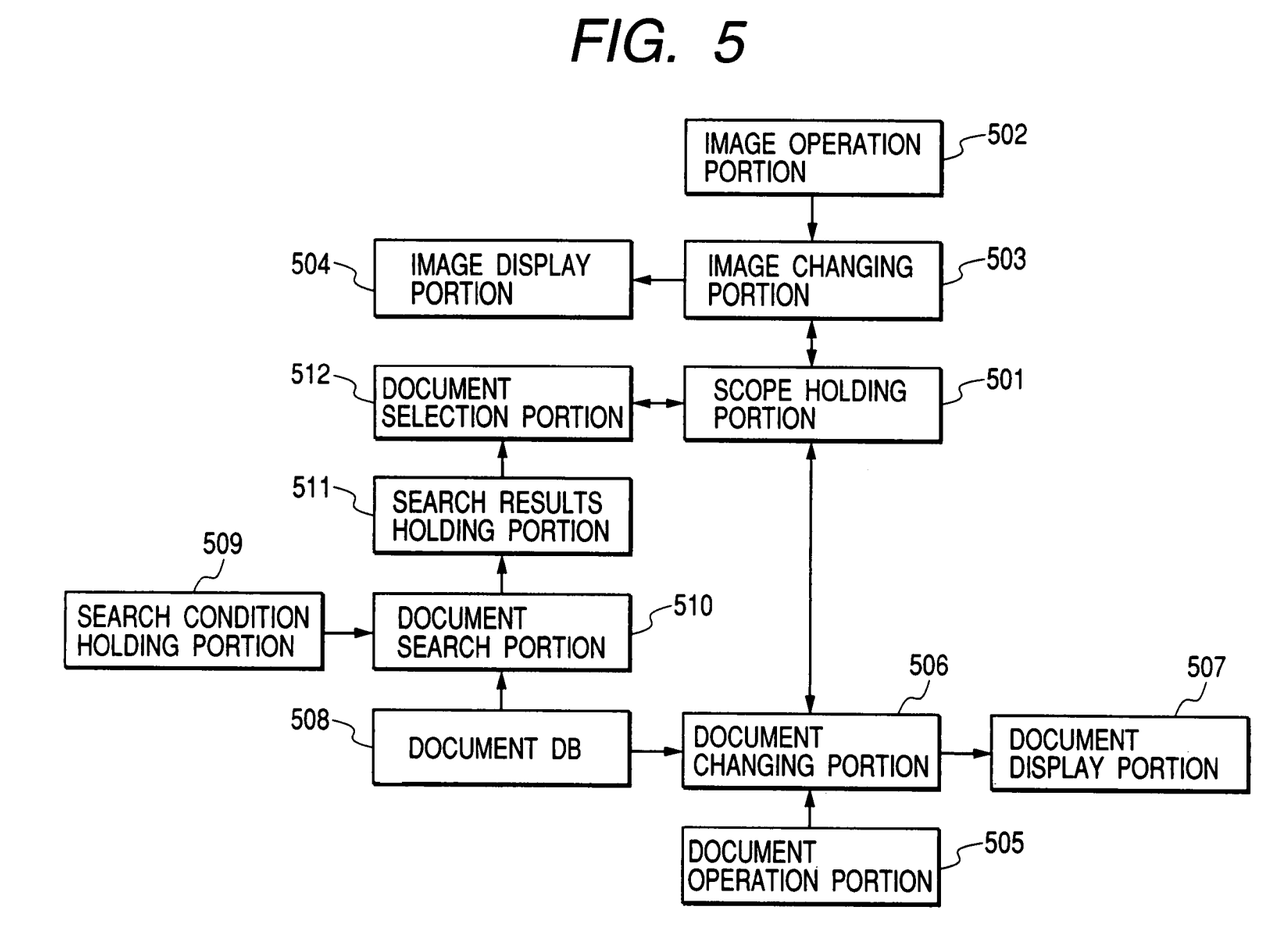
FIGS. 5, 6 and 7 are block diagrams showing the basic configurations of the document searching apparatus in other embodiments of the present invention.
Figure 6:
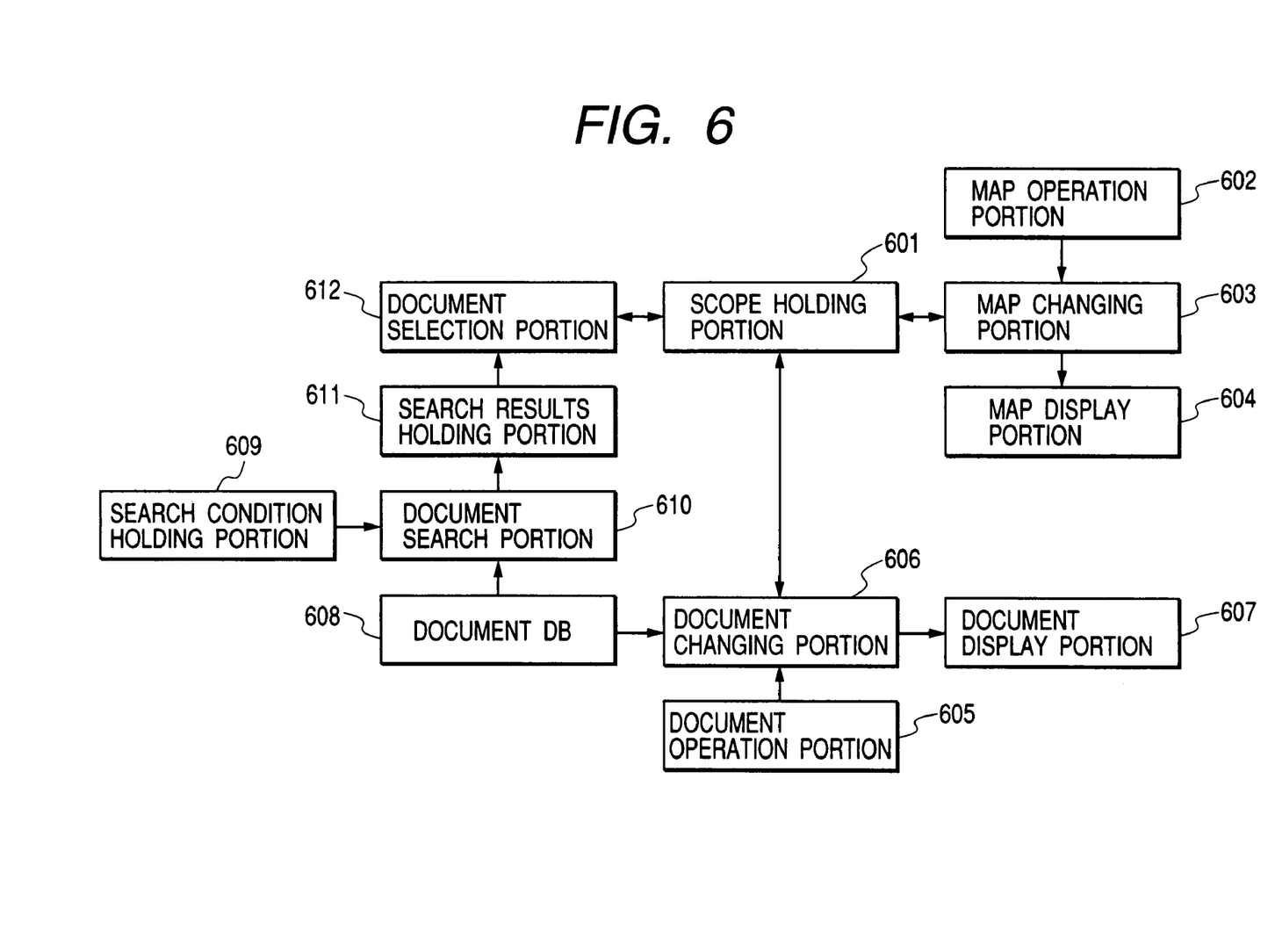

In the foregoing embodiment there has been explained a case of linking the image and the map with the document, but such configuration is not restrictive and either one of the image and the map may be combined with the document. More specifically, there may be adopted a combination or image and document, or a combination of map and document. FIG. 5 shows a configuration in case the image and the document are combined, while FIG. 6 shows a configuration in case the map and the document are combined.

Also in the foregoing embodiment there has been explained a case of executing efficient search on the object contemplated by the user, but the system may be so constructed as to provide an advice (active information providing) to the user instead of the search. Since the advice is given only to the currently contemplated object, there can be suppressed the generation of unnecessary advices.

Figure 7:
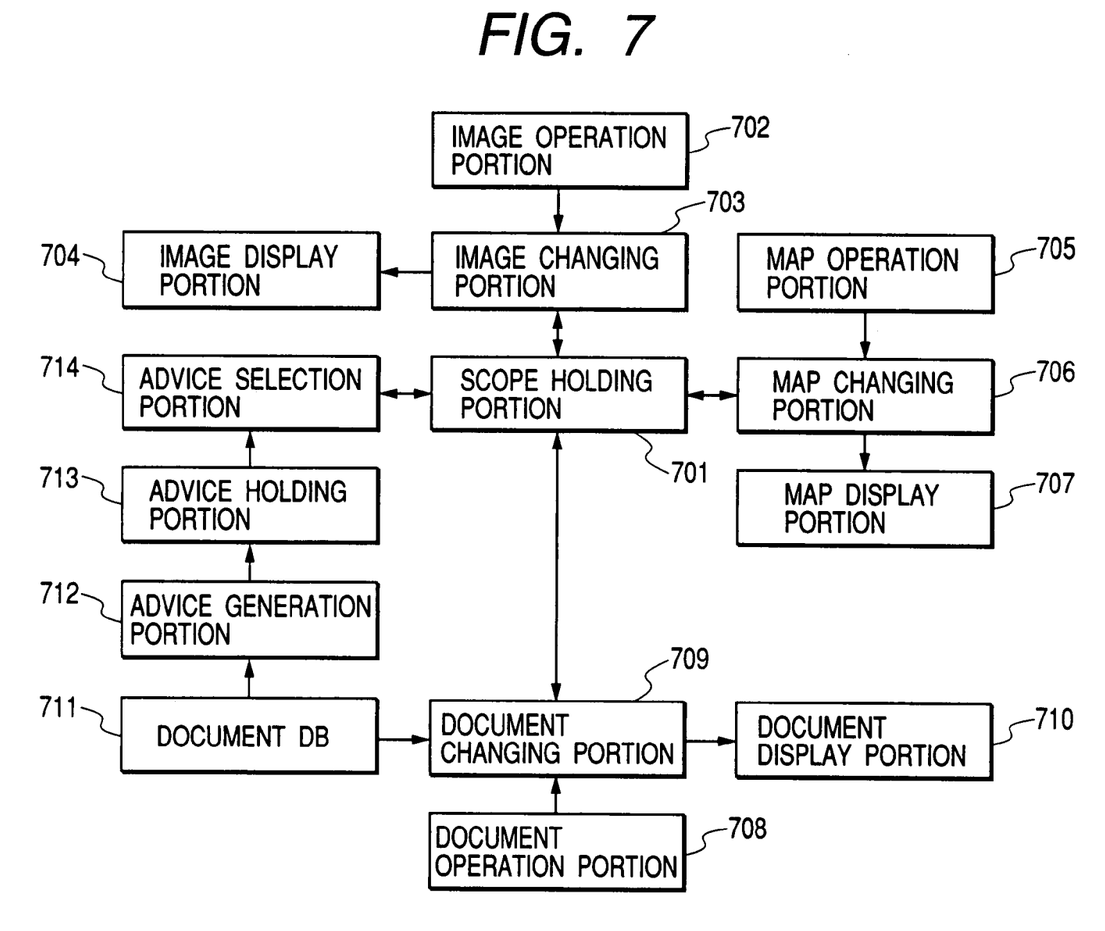

FIG. 7 shows the configuration in such case. The corresponding process executes advice generation instead of the search in the flow chart shown in FIG. 3, and there is selected the advice matching the current scope. It is also possible execute both the search and the advice.

Also in the foregoing embodiment, there is selected, among the result of document search, that matching the scope, but it is also possible to initially set only the documents matching the scope as the object of search. In such case, the documents obtained as the result of search immediately correspond to the current scope.

Also the foregoing embodiment has been explained by the application to a shopping mall, but such configuration is not restrictive and the present invention may be applied to any geographical location such as a sight-seeing spot or a downtown area. Also the scope is not limited to a store.

Also the foregoing embodiment has been explained by a case where the constituent portions are constructed on a same computer, but such configuration is not restrictive and such portions may be constituted by computers or processing devices dispersed on a network.

Also in the foregoing embodiment there has been explained a case where the program is stored in a ROM, but such configuration is not restrictive and the program may be stored in an arbitrary memory medium or realized by circuits of similar functions.

The present invention may be applied to a system consisting of plural equipment or an apparatus consisting of a single equipment.

Also the present invention includes a case where the program codes of a software realizing the functions of the aforementioned embodiments are supplied to a computer of a system or an apparatus and the functions of the aforementioned embodiments are realized by reading and executing the program codes stored in a memory medium by the computer (or CPU or MPU) of the above-mentioned system or apparatus.

In such case the program codes themselves of the software realize the functions of the aforementioned embodiments, and the program codes themselves and the memory medium storing such program codes constitutes the present invention.

The memory medium storing such program codes can be, for example, a floppy disk, a hard disk, an optical disk, a magnetooptical disc, a CD-ROM, a CD-R, a DVD-ROM, a DID-RAM, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing, the present invention allows to execute search on the currently contemplated object only, without definite designation of the range of search object by the user, so that the efficiency of search can be improved.

What is claimed is:

1. An information searching apparatus comprising:
   a search device controlling a search of document information in accordance with a search condition;
   a camera control device controlling a field of view of a camera by panning, tilting, and zooming of the camera;

a memory holding object information about an object in a field of view of the camera controlled by the camera control device, as a range of search, wherein the search device uses the object information as a part of the search condition to control the search;

a memory control device controlling the memory to hold the object information in a case of a change being made to the field of view; and a display control device controlling a display of an image from the camera and a final result of document information of the object in the field of view controlled by the camera control device, selected from the searched document information, wherein the final result that is displayed includes the search results obtained by the search controlled by the search device in accordance with the object information in combination with the rest of the search condition.

2. An information searching method comprising the steps of:

controlling a search, performed by a search device, of document information in accordance with a search condition;

controlling a field of view of a camera by panning, tilting and zooming of the camera;

holding object information, in a memory, about an object in a field of view of the camera controlled by the camera control device, as a range of search, wherein the search device uses the object information as a part of the search condition to control the search, and controlling the memory to hold the object information in a case of a change being made to the field of view, as a range of search; and controlling a display of an image from the camera and a final result of document information of the object in the field of view controlled by the camera control device, selected from the searched document information, wherein the final result that is displayed includes the search results obtained by the search controlled by the search device in accordance with the object information in combination with the rest of the search condition.

* * * * *